US007660095B2

(12) United States Patent
Shato et al.

(10) Patent No.: US 7,660,095 B2
(45) Date of Patent: Feb. 9, 2010

(54) SURGE PROTECTOR

(75) Inventors: Yasuhiro Shato, Yokoze-machi (JP); Tuyoshi Ogi, Yokoze-machi (JP); Miki Adachi, Naka (JP); Sung-Gyoo Lee, Naka (JP); Takashi Kurihara, Yokoze-machi (JP); Toshiaki Ueda, Naka (JP)

(73) Assignee: Mitsubishi Materials Corporation, Tokyo (JP)

( * ) Notice: Subject to any disclaimer, the term of this patent is extended or adjusted under 35 U.S.C. 154(b) by 39 days.

(21) Appl. No.: 10/565,422

(22) PCT Filed: Jul. 13, 2004

(86) PCT No.: PCT/JP2004/009958

§ 371 (c)(1), (2), (4) Date: Nov. 30, 2006

(87) PCT Pub. No.: WO2005/008853

PCT Pub. Date: Jan. 27, 2005

(65) Prior Publication Data

US 2007/0058317 A1 Mar. 15, 2007

(30) Foreign Application Priority Data

Jul. 17, 2003 (JP) ............................. 2003-198667
Mar. 9, 2004 (JP) ............................. 2004-065728

(51) Int. Cl.
*H02H 1/00* (2006.01)

(52) U.S. Cl. ...................................................... 361/120

(58) Field of Classification Search ................. 361/118, 361/120

See application file for complete search history.

(56) References Cited

U.S. PATENT DOCUMENTS 3,345,218 A * 10/1967 Brookover et al. ....... 428/472.1
3,989,985 A * 11/1976 Lange et al. ................ 361/120
4,410,831 A * 10/1983 Shigemori et al. .......... 313/325
5,506,071 A * 4/1996 Tanaka et al. ............... 429/181
5,559,663 A * 9/1996 Tanaka et al. ............... 361/127
2001/0053056 A1* 12/2001 Katoda ....................... 361/118

FOREIGN PATENT DOCUMENTS

| | | |
|---|---|---|
| JP | 04-043584 | 2/1992 |
| JP | 5-242951 | 9/1993 |
| JP | 6-310252 | 11/1994 |
| JP | 7-335368 | 12/1995 |
| JP | 09-071812 | 3/1997 |
| JP | 09-092429 | 4/1997 |
| JP | 10-106712 | 4/1998 |
| JP | 2000-268934 | 9/2000 |

* cited by examiner

*Primary Examiner*—Danny Nguyen
*Assistant Examiner*—Tien Mai
(74) *Attorney, Agent, or Firm*—Darby & Darby P.C.

(57) ABSTRACT

A surge protector coated with an oxide layer having an excellent chemical stability at the high temperature range and excellent adherence with respect to main discharge electrodes. The surge protector includes a column-shaped ceramic member that has a conductive film divided by a discharge gap interposed therebetween; a pair of main discharge electrode members opposite to each other on both ends of the column-shaped ceramic member to come in contact with the conductive film; and a cylindrical ceramic tube which is fitted to the pair of main discharge electrode members opposite to each other to seal both the column-shaped ceramic member and sealing gas inside thereof. Oxide films are formed on main discharge surfaces of at least the protrusive supporting portions of the pair of main discharge electrode members opposite to each other, by performing an oxidation treatment, respectively.

2 Claims, 12 Drawing Sheets

SURGE PROTECTOR

CROSS-REFERENCE TO PRIOR APPLICATION

This is a U.S. National Phase Application under 35 U.S.C. §371 of International Patent Application No. PCT/JP2004/009958 filed Jul. 13, 2004, and claims the benefit of Japanese Patent Application Nos. 2003-198667 filed Jul. 17, 2003 and 2004-065728 filed Mar. 9, 2004, all of which are incorporated by reference herein. The International Application was published in Japanese on Jan. 27, 2005 as WO 2005/008853 A1 under PCT Article 21(2).

BACKGROUND OF THE INVENTION

1. Field of the Invention

The present invention relates to a surge protector for protecting various devices from surges and preventing accidents from occurring.

2. Description of the Related Art

A surge protector is connected to circuits in which electronic devices used in telecommunication equipment (e.g. telephones, facsimiles, modems, etc.); communication lines, power cables, antennas or CRT driving circuits, etc., which are subject to electrical shocks due to abnormal current flow (surge current) or abnormal voltage (surge voltage) such as lightning surge and static charge, to prevent the destruction caused by a thermal damage and shorting of the electronic devices or the printed circuit board, on which the electronic devices are mounted, due to abnormal voltage.

In the related art, the surge protector which is provided with a surge absorbing element having a micro gap has been proposed, for example. The surge protector includes a column-shaped ceramic member coated with a conductive film. A so-called micro gap is formed on the periphery of the column-shaped ceramic member. Both the surge absorbing element, which has a pair of cap-shaped electrodes on both ends of the ceramic member, and a sealing gas is housed in a glass tube. Then, sealing electrodes, having lead wiring lines on both ends of the cylindrical glass tube are sealed by heating at high temperature. Accordingly, this surge protector is an electric discharge surge protector.

In recent years, even in the case of the electric discharge surge protector, the service life thereof has been prolonged. As an example, the surge protector has a $SnO_2$ coating layer, which has a lower volatility than that of cap-shaped electrodes during the discharge, formed on surfaces in which a main discharge of the cap-shaped electrodes is performed. By structures of the surge protector, it is possible to restrain the metal components of the cap-shaped electrodes from sputtering to an inner wall of the glass tube or a micro gap at the main discharge duration. Therefore, the service life of the surge protector is lengthened (For example, see JP-A-10-106712 (page 5, FIG. 1)).

As the size of devices reduces, it can be surface mounted. As an example of the surge protector, the surface mounting type (melph type) surge protector has been proposed. In the surface mounting type surge protector, since sealing electrodes do not have lead wiring lines, when the surge protector is mounted, the sealing electrodes are connected to a circuit board by soldering to be fixed thereto (For example, see JP-A-2000-268934 (FIG. 1)).

As shown in FIG. 12, the surge protector 100 includes a plate-shaped ceramic member 103 having a conductive film 102 divided by a discharge gap 101 in the middle on one surface thereof; a pair of sealing electrodes 105 disposed on both ends of the plate-shaped ceramic member 103; and an cylindrical ceramic member 107 disposed to fit to the pair of sealing electrodes 105 which are disposed on the both ends of the plate-shaped ceramic member 103 and to seal both the plate-shaped ceramic member 103 and a sealing gas 106.

Each of the sealing electrodes 105 includes a terminal electrode member 108, and a conductive leaf spring 109 which is electrically connected to the terminal electrode member 108 to come in contact with the conductive film 102.

However, the conventional surge protector has the following problems. That is, in the conventional surge protector, $SnO_2$ film is formed by means of, for example, a thin film formation method such as a chemical vapor deposition (CVD). However, since the $SnO_2$ film has a weak adherence to the cap-shaped electrode, the $SnO_2$ film characteristics cannot sufficiently be exhibited due to a peeling of the $SnO_2$ film at the main discharge duration.

SUMMARY OF THE INVENTION

The invention is made to solve the above-mentioned problems, and an object of the present invention is to provide a long service life surge protector on which an oxide layer having excellent chemical stability in the high temperature range and an excellent adherence to the main discharge electrode is coated.

To solve the above-mentioned problems, the surge protector according to the invention includes an insulating member having a conductive film divided by a discharge gap interposed therebetween; a pair of main discharge electrode members opposite to each other on the insulating member to come in contact with the conductive film; and an insulating tube which is fitted to the pair of main discharge electrode members opposite to each other to seal both the insulating member and sealing gas inside thereof. Further, oxide films are formed on main discharge surfaces of the pair of main discharge electrode members by performing an oxidation treatment, respectively.

An abnormal current flow and abnormal voltage, such as surge irrupting from the outside, trigger the discharge in the micro gap, and then main discharge is performed between the main discharge surfaces of the pair of protrusive supporting portions, which are disposed opposite to each other, to absorb the surge.

According to the invention, since oxide films are formed on the main discharge surfaces, respectively, the main discharge surfaces have excellent chemical stability at the high temperature range. Therefore, it is possible to restrain the metal components of the cap-shaped electrodes from scattering into an inner wall of the insulating tube or the micro gap at the main discharge duration so as to not be deposited to the micro gap or on the inner wall of the insulating tube. As a result, the service life of the surge protector is lengthened. In addition, since the oxide films have excellent adherence to the main discharge surfaces, the characteristics of the oxide films can be exhibited. Furthermore, in the invention, since it is not necessary that the main discharge electrode members be made of expensive metals having excellent chemical stability at the high temperature range, the main discharge electrode members can be made of inexpensive metals.

In addition, a surge protector according to the invention includes: a column-shaped insulating member having a conductive film divided by a discharge gap interposed in an intermediate of a peripheral surface; a pair of main discharge electrode members opposite to each other on both ends of the insulating member to come in contact with the conductive film; and an insulating tube which is fitted to the pair of main discharge electrode members opposite to each other to seal both the insulating member and sealing gas inside thereof. In this case, the main discharge electrode members include peripheral portions being attached to the end faces of the insulating tube by brazing filler metal, and protrusive supporting portions protruding toward an inside and an axial direction of the insulating tube and supporting the insulating member in the radial inner surface thereof. Furthermore, oxide films are formed on main discharge surfaces of the protrusive supporting portions of the pair of main discharge electrode members, which are oppositely disposed from each other, by performing an oxidation treatment, respectively.

According to the invention, since the oxide films having excellent adherence to the main discharge surfaces are formed on the main discharge surfaces, the characteristics of the oxide films can be exhibited. As a result, the service life of the surge protector can be lengthened.

Further, in the surge protector according to the invention, each of the oxide films has an average thickness in the range of 0.01 to 2.0 μm.

According to the invention, since each of the oxide films has an average thickness of 0.01 μm or more, it is possible to sufficiently restrain the electrode components of the main discharge electrode members from scattering by the main electrode. Furthermore, since each of the oxide films has an average thickness of 2.0 μm or less, it is possible to lengthen the service life of the surge protector by preventing the easy scattering of the oxide films.

In addition, it is preferable that each of the oxide films has an average thickness in the range of 0.2 to 1.0 μm so as to prolong the service life of the surge protector.

Furthermore, in the surge protector according to the invention, the main discharge electrode members contain Cr which is enriched on the surface of the oxide films.

According to the invention, the oxide films having excellent adherence to the main discharge surfaces are formed by enriching Cr (chrome) oxide having an excellent chemical stability at the high temperature range, a high-melting point, and a conductive property, on the surface of the oxide films. Accordingly, the characteristics of oxide films can be exhibited, and thus the service life of the surge protector can be lengthened.

Here, enrichment means that the composition of the surface of the oxide films is larger than the bulk composition of the main discharge electrode members.

DESCRIPTION OF THE PREFERRED EMBODIMENTS

Hereinafter, a surge protector according to an embodiment of the invention will be described with reference to FIGS. 1 to 3.

Figure 1:
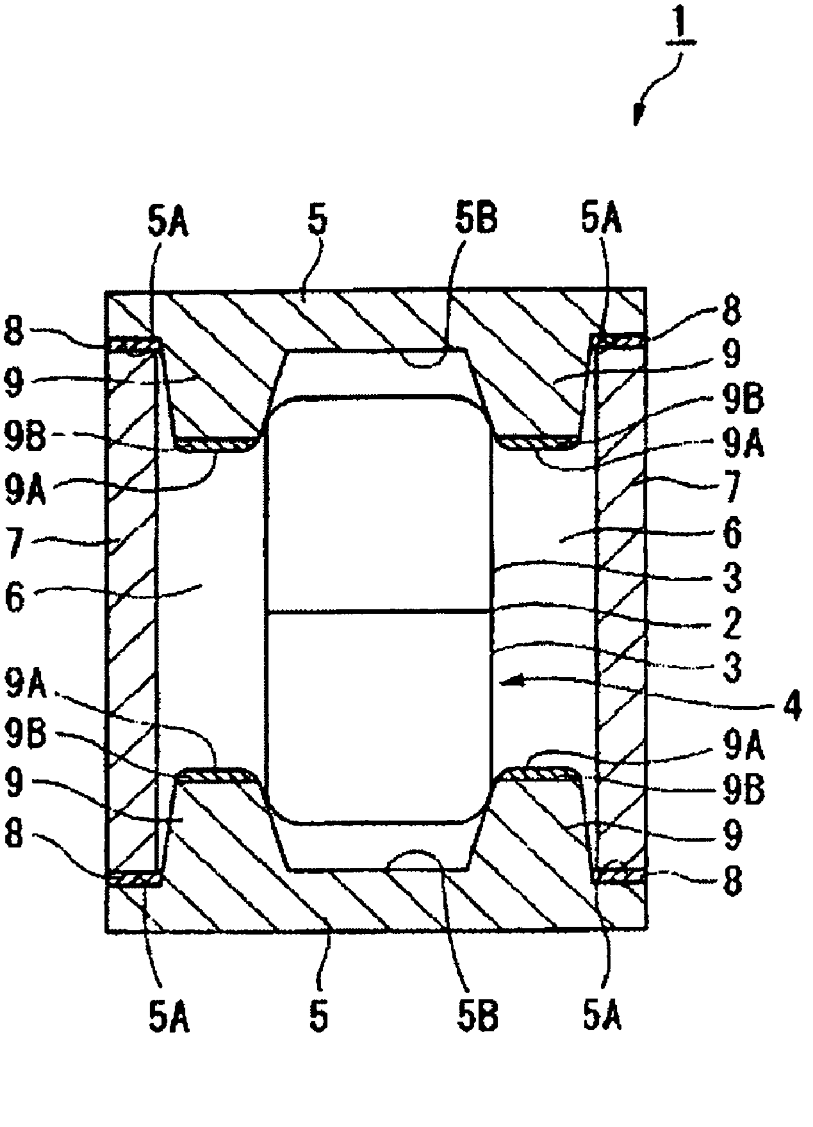
FIG. 1 is a cross-sectional view showing a surge protector according to an embodiment of the invention in an axial direction.

As shown in FIG. 1, the surge protector 1 according to the present embodiment is a discharge surge protector using a so-called micro gap. The surge protector includes a column-shaped ceramic member (insulating member) 4 that has a conductive film 3 divided by a discharge gap 2 interposed in the middle on a peripheral surface thereof. A pair of main discharge electrode members 5 are disposed opposite to each other on both ends of the column-shaped ceramic member 4 so as to come in contact with the conductive film 3, and an cylindrical ceramic member (insulating tube) 7 which are fitted to the pair of main discharge electrode members 5 opposite to each other so as to seal both the column-shaped ceramic member 4 and a sealing gas 6, such as Ar (argon) that composition is adjusted in order to obtain desired electrical characteristics.

The column-shaped ceramic member 4 is made of a ceramic material such as a mullite sintered body, and has a thin film made of TiN (titanium nitride), serving as the conductive film 3, formed by a thin film formation method such as a physical vapor deposition (PVD) and chemical vapor deposition (CVD) on the surface thereof.

One to one hundred discharge gaps having width in the range of 0.01 to 1.5 mm may be formed by a process such as laser cutting, dicing, etching, etc. However, in the present embodiment, one discharge gap having a width of 150 μm is formed on the surface of the column-shaped ceramic member.

The pair of main discharge electrode members 5 can be composed of KOVAR® that is an alloy of Fe (iron), Ni (nickel), and Co (cobalt).

Figure 2A:
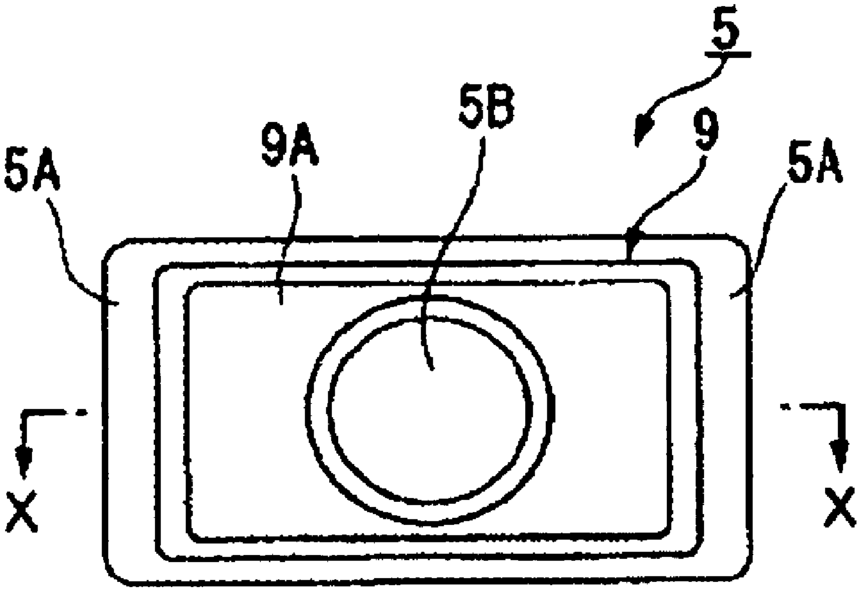
FIG. 2A is a plan view showing a terminal electrode member according to the embodiment of the invention in FIG. 1.
Figure 2B:
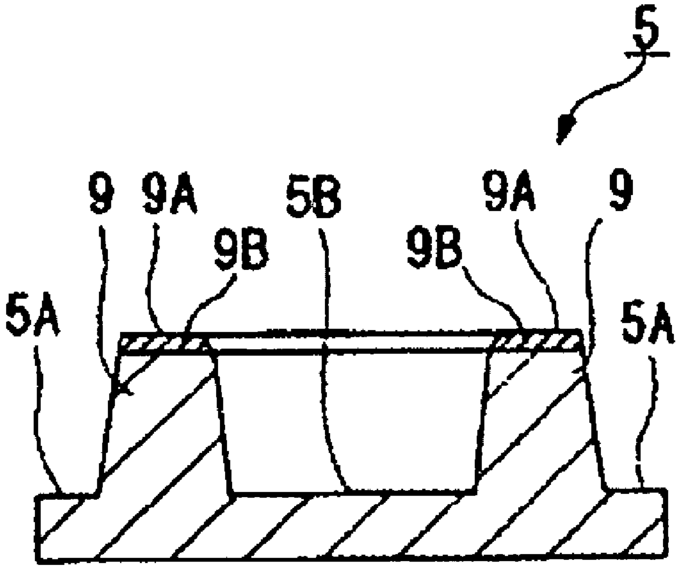
FIG. 2B is a cross-sectional view taken along line X-X of FIG. 2A.

As shown in FIGS. 2A and 2B, each of the main discharge electrode members 5 includes a rectangular peripheral portions 5A, which are attached to the end face of the cylindrical ceramic members 7 by brazing filler metal 8 and has an aspect ratio smaller than 1. Protrusive supporting portions 9, which can be disposed on the cylindrical ceramic members 7 to protrude in an axial direction and support the column-shaped ceramic member 4. Furthermore, each of the main discharge electrode members has a central area 5B at a position thereon, which is surrounded by the protrusive supporting portion 9 and faces the end face of the column-shaped ceramic member 4.

The protrusive supporting portions 9 preferably have a taper portion on the radial inner surface thereof, respectively, so that the end of the column-shaped ceramic member 4 and the radial inner surface of the protrusive supporting portions 9 are easily press-fitted or inserted to each other. In addition, the end faces of the protrusive supporting portions 9 of the two main discharge electrode members 5 opposite to each other, serves as main discharge surfaces 9A.

Here, oxide films 9B having average thickness of 0.6 μm are formed on the main discharge surfaces 9A of the main discharge electrode members 5, respectively, by performing an oxidation treatment in atmosphere, at 500° C., for 30 minutes.

The cylindrical ceramic members 7 are made of an insulating ceramic material such as $Al_2O_3$ (alumina), and have a rectangular cross-section. Each of both end faces of the cylindrical ceramic members has the substantially same dimension as that of the peripheral portions 5A.

Next, a method of manufacturing the above-mentioned surge protector 1 according to the present embodiment will be described.

First, the pair of main discharge electrode members 5 is integrally formed in a predetermined shape by a blanking process. Then, the oxide films 9B, having average thickness of 0.6 μm, are formed on the main discharge surfaces 9A, respectively, by performing an oxidation treatment in, atmosphere, at 500° C., for 30 minutes. The thickness of the oxide film 9B is an average value of measured values obtained as follows: A groove is formed on the surface of the oxide films 9B by FIB (Focused Ion Beam), and then the dimension of the cross-section of the grooves is measured at several positions (for example, twenty positions) by a scanning electron microscope to obtain measured values.

For example, metallization layers, which consisted of a molybdenum (Mo)-tungsten (W) layer and a nickel layer, respectively, are formed on both end faces of the cylindrical ceramic members 7 to improve the wettability of the brazing filler metal 8 against the end faces.

Furthermore, the column-shaped ceramic member 4 can be placed on the central area of one main discharge electrode member 5 so that the radial inner surface of the protrusive supporting portions and the end of the column-shaped ceramic member 4 come in contact with each other. In addition, the cylindrical ceramic member 7 is placed on the other main discharge electrode member 5 in a state in which the brazing filler metal 8 is interposed between the peripheral portion 5A and the end face of the cylindrical ceramic member 7.

Then, the main discharge members 5 are placed on the column-shaped ceramic member so that the upper portion of the column-shaped ceramic member 4 faces the central area 5B, and thus the radial inner surface and the column-shaped ceramic members 4 come in contact with each other. The brazing filler metal 8 is interposed between the peripheral portion 5A and the end face of the cylindrical ceramic member 7.

When the assembly body composed of the components is in a temporary assembly state as described above, the assembly body is brought to a vacuum state and then is heated in the sealing gas atmosphere until the brazing filler metal 8 is melted. In this case, since the brazing filler metal 8 is melted, the column-shaped ceramic member 4 is sealed. After that, the surge protector 1 is manufactured by rapidly cooling the assembly body.

Figure 3:
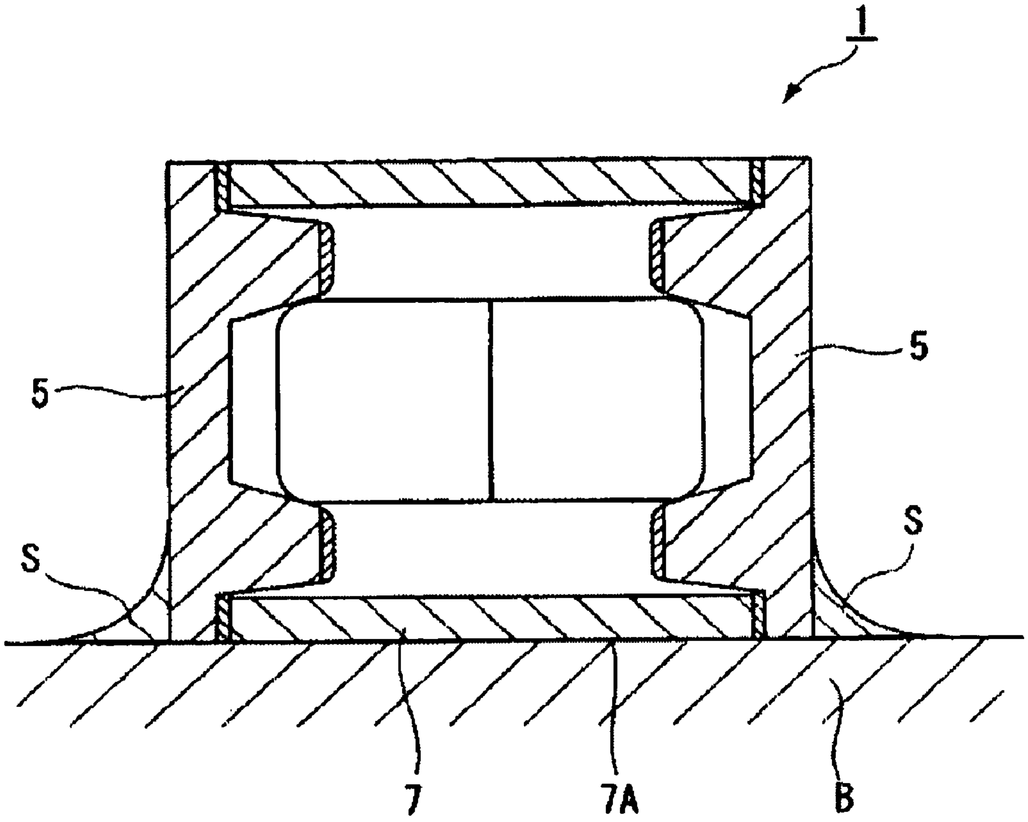
FIG. 3 is a cross-sectional view showing a state in which the surge protector is mounted on a substrate according to the embodiment of the invention in FIG. 2.

Then, as shown in FIG. 3, the surge protector 1 manufactured as described above is placed on a board B such as a printed circuit board so that a side surface of cylindrical ceramic member 7, that is, a mounting surface of the surge protector 1, comes in contact with the board. After that, the outer surfaces of the pair of main charge members 5 are adhered and fixed to the board B by solder S, and then the surge protector can be used.

According to the above-mentioned structure, the oxide films 9B having average thickness of 0.01 to 2.0 μm are formed by performing the oxidation treatment on the main discharge surfaces 9A, respectively. Accordingly, the main discharge surfaces 9A can have chemical (thermodynamic) stability in the high temperature range. In addition, since the oxide films 9B have excellent adherence to the main discharge electrode members 5, the characteristics of the oxide films 9B can be exhibited. For this reason, even though the temperature of the protrusive supporting portion 9 is high at the time of the main discharge, it is possible to sufficiently prevent the metal components of the main discharge electrode members 5 from scattering into the discharge gap 2 or onto the inner wall of the cylindrical ceramic members 7. Therefore, the service life of the surge protector is lengthened.

Figure 4:
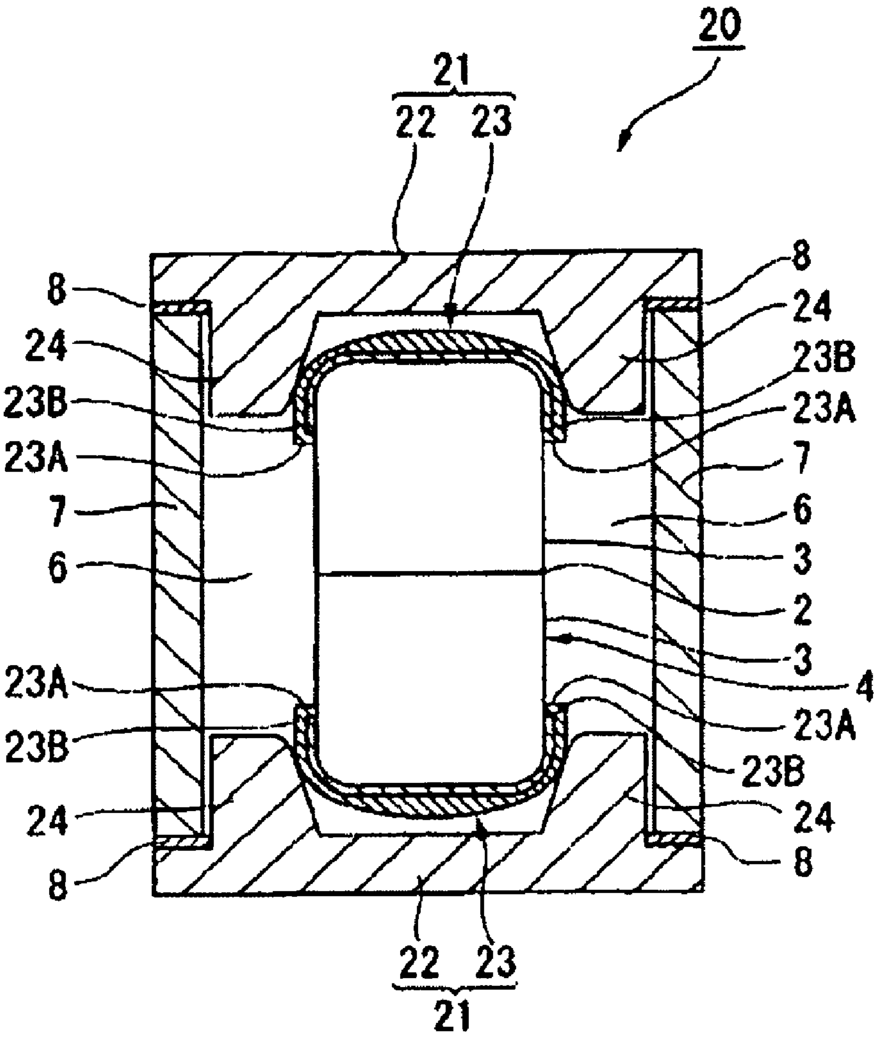
FIG. 4 is a cross-sectional view showing a surge protector according to another embodiment of the invention in an axial direction.

Next, another embodiment will be described with reference to FIG. 4.

Furthermore, the embodiment described here below has the same basic structure as that of the previous embodiment, and has structure in which another component is included in the above-mentioned embodiment. Accordingly, in FIG. 4, the same components as those in FIG. 1 are indicated by the same reference numerals, and the description thereof will be omitted.

The difference between this embodiment and the previous embodiment is that the column-shaped ceramic member 4 is supported by the protrusive supporting portions 9 of the main discharge electrode members 5. However, in a surge protector 20 according to this embodiment, each of main discharge electrode members 21 includes a cap-shaped electrode 23 and a terminal electrode member 22, which is similar to the main discharge electrode member 5 of the previous embodiment, and the column-shaped ceramic member 4 is supported by the protrusive supporting portions 24 with the cap-shaped electrode 23 therebetween.

A pair of cap-shaped electrodes 23 has hardness lower than that of the column-shaped ceramic member 4, and can be plastically deformed. For example, the pair of cap-shaped electrodes are made of stainless steel, and the outer peripheral portion of the cap-shaped electrode extends in the axial direction so that the end face of the outer peripheral portion of the cap-shaped electrode is located in the inner position compared to the end of the protrusive supporting portions 24 of the terminal electrode member 22. Accordingly, the pair of cap-shaped electrodes are formed in a "U" shape and the outer peripheral portion of the cap-shaped electrode serves as main discharge faces 23A.

For example, when the pair of cap-shaped electrodes are made of JIS SUS304 stainless steel, oxide films 23B having thickness of 0.6 μm are formed on the surfaces of the pair of cap-shaped electrodes 23, respectively, by performing an oxidation treatment in a reducing atmosphere, which is controlled to have a predetermined oxygen concentration, at 700° C. for 40 minutes.

Next, a method of manufacturing the surge protector 20 according to the present embodiment, in which the above-mentioned 1 cap-shaped stainless steel is used, will be described.

After the annealing treatment, the pair of terminal electrode members 22 is integrally formed by a blanking process.

The oxide films 23B have a thickness of 0.6 μm and Cr of 10% or more enriched on the surface thereof are formed on the surfaces of the pair of cap-shaped electrodes 23, respectively, by performing an oxidation treatment in the reducing atmosphere which is controlled to have a predetermined oxygen concentration, at 700° C. for 40 minutes. The enrichment of Cr on the surface of the oxide films 23B is confirmed by obtaining an average value of the values, which are measured by a surface analysis using the auger electron spectroscopy analysis at several positions (for example, five positions) on the oxide films.

After that, when the pair of cap-shaped electrodes 23 are engaged with both ends of the column-shaped ceramic member 4, the surge protector 20 is manufactured in the manner similar to the previous embodiments.

The surge protector 20 has the same operation and effect as those of the surge protector 1 according to the above-mentioned previous embodiments.

Figure 5A:
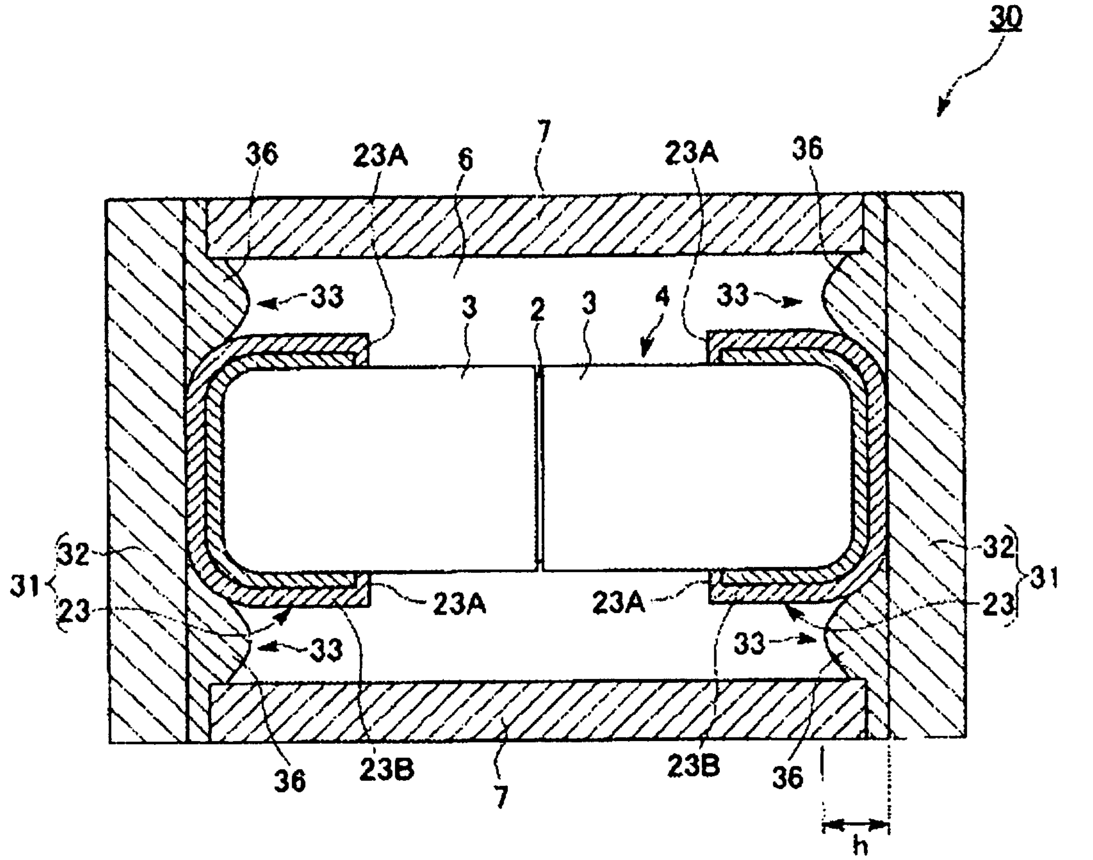
FIG. 5A is a cross-sectional view in an axial direction showing a surge protector according to a further embodiment of the invention.

Next, an embodiment will be described with reference to FIGS. 5A and 5B.

Furthermore, the embodiment described herein has the same basic structure as that in the above embodiment, and has structure in which another component is included in the above-mentioned embodiment. Accordingly, in FIG. 5, the same components as those in FIG. 4 are indicated by the same reference numerals, and the description thereof will be omitted.

In the previous embodiment, the protrusive supporting portions 24 are integrally formed with the terminal electrode member 22. However, in a surge protector 30 according to this embodiment, each of main discharge electrode members 31 includes a flat terminal electrode member 32 and a cap-shaped electrode 23, as shown in FIG. 5A.

In addition, brazing filler metal 33 is coated on the inner surfaces of the pair of terminal electrode members 32, which face each other.

Figure 5B:
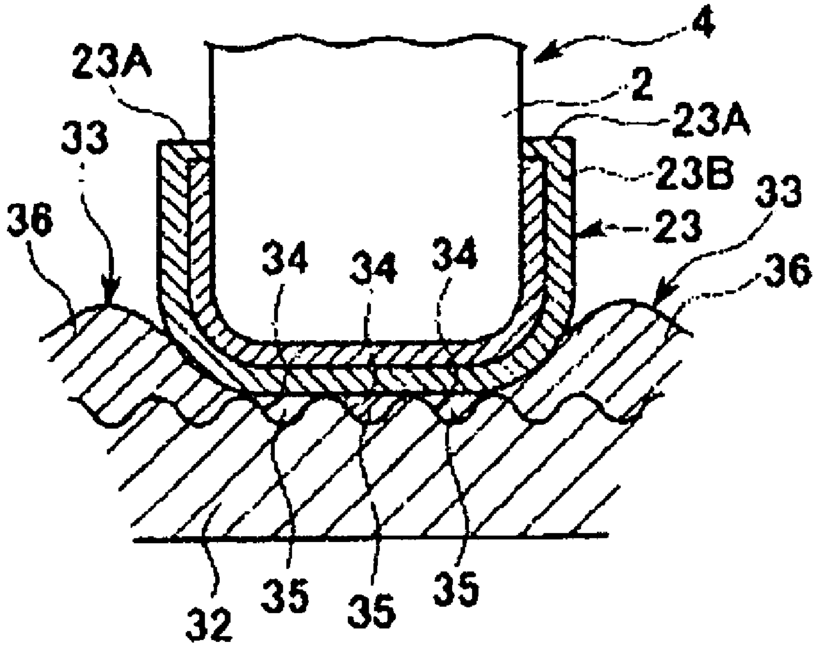
FIG. 5B is an enlarged view showing a contact part between a terminal electrode member and a cap-shaped electrode of the further embodiment.

As shown in FIG. 5B, the brazing filler metal 33 includes a filling portion 35 for plugging gaps formed on the contact surfaces between the pair of terminal electrode members 32 and the cap-shaped electrodes 23, and a holding portion 36 for holding the outer peripheral surfaces of the cap-shaped electrodes 23 on outer sides of the cap-shaped electrodes 23.

Furthermore, the height h of the holding portion 36 is formed lower than that of the cap-shaped electrode 23. Accordingly, the surfaces of the cap-shaped electrodes 23 opposite to each other, serve as main discharge faces 23A.

Next, a method of manufacturing the surge protector 30 according to the present embodiment, which has the above-mentioned structure, will be described.

First, similar to the above-mentioned second embodiment, oxide films 23B are formed on the surfaces of the pair of cap-shaped electrodes 23, respectively, and the pair of cap-shaped electrodes 23 are engaged with both ends of the column-shaped ceramic member 4.

In addition, an amount of brazing filler metal 33 enough to form the holding portion 36 is coated on one surface of one terminal electrode member 32, and the column-shaped ceramic member 4 engaged with the cap-shaped electrodes 23 is placed on the central area of the one terminal electrode member 32 so that the one terminal electrode member 32 and the cap-shaped electrode 23 come in contact with each other. Next, the cylindrical ceramic members 7 are placed on the one terminal electrode member 32 so that one end face of the cylindrical ceramic members 7 comes in contact with the brazing filler metal 33.

After that, the other terminal electrode member 32, on which the brazing filler metal 33 is coated, is placed on the other end face of the cylindrical ceramic member 7, and thus temporary assembly is completed.

A sealing process is described below. When the above assembly body in a temporary assembly state as described above is heated in the Ar atmosphere, the brazing filler metal 33 is melted and thus the terminal electrode members 32 and the cap-shaped electrode members 23 come in close contact with each other, respectively. In this case, the filling portions 35 of the brazing filler metal 33 plug the gaps between the cap-shaped electrodes 23 and the terminal electrode members 32. In addition, the outer sides of the cap-shaped electrodes 23 are buried and held in the holding portions 36 is formed by the surface tension of the brazing filler metal 33.

Similar to the above-mentioned embodiments, the surge protector 30 is manufactured by performing a cooling process.

The surge protector 30 has the same operation and effect as those of the surge protector 1 according to the above-mentioned embodiment.

Furthermore, in the present embodiment, the holding portions 36 and the filling portions 35 are made of same material as the brazing filler metal 33. However, the filling portions 35 may be made of material different from the brazing filler metal 33, and may be a conductive adhesive (for example, active silver-alloy brazing) capable of attaching the oxide film 23B and the terminal electrode member 32. In this way, the cap-shaped electrode 23 and the terminal electrode member 32 are attached to each other, and it is possible to obtain more sufficient ohmic contact between the main discharge electrode members 31 and conductive film 3. Accordingly, electrical characteristic of the surge protector 30 such as discharge starting voltage is stabilized.

In addition, similar to the filling portions 35, the holding portions 36 may also be made of material different from the brazing filler metal 33, and may be, for example, glass material having low wettability against the brazing filler metal or active silver-alloy brazing. In this way, the column-shaped ceramic member 4 is more reliably fixed on the central area of the terminal electrode member 32 or in the vicinity thereof.

Figure 6:
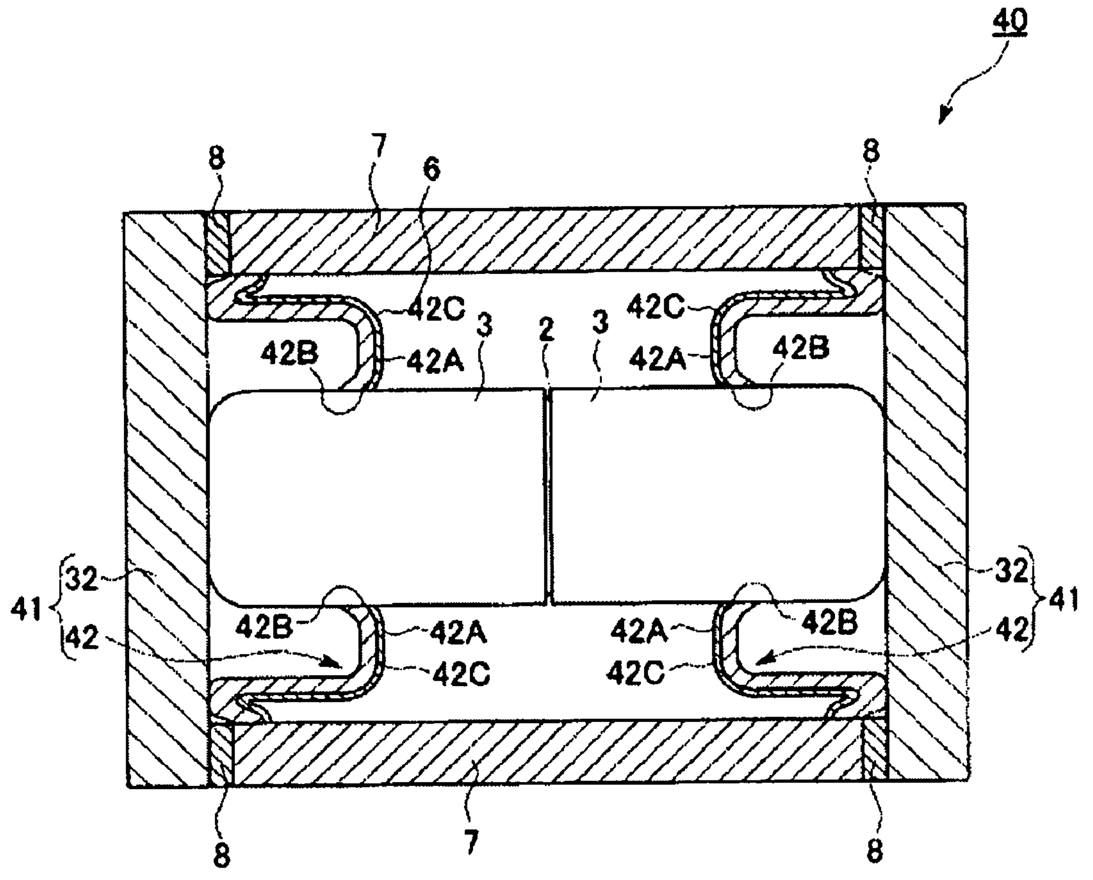
FIG. 6 is a cross-sectional view showing a surge protector according to another embodiment of the invention in an axial direction.

Next, an embodiment is described below with reference to FIG. 6.

Furthermore, the embodiment described herein has the same basic structure as that in the previous embodiments, and has structure in which another component is included in the above-mentioned embodiments. Accordingly, in FIG. 6, the same components as those in FIG. 1 are indicated by the same reference numerals, and the description thereof will be omitted.

The difference between the embodiments are in the previous embodiments, the protrusive supporting portions 9 are integrally formed with the column-shaped ceramic member 4, respectively, and the column-shaped ceramic member 4 is press-fitted or inserted to the protrusive supporting portions 9. However, in a surge protector 40 according to this embodiment, each of main discharge electrode members 41 includes a terminal electrode member 32 and a protrusive supporting portion 42.

Each of the protrusive supporting portions 42 is formed in a cylindrical shape with a bottom, and has an opening 42B formed at the center of a bottom face 42A. A diameter of the opening 42B is slightly smaller than that of the column-shaped ceramic member 4. Furthermore, when the column-shaped ceramic member 4 is inserted into the opening 42B, each of the bottom faces 42A is elastically bent outward in the radial direction. Accordingly, it is possible to obtain excellent ohmic contact between the protrusive supporting portions 42 and the conductive film 3.

In addition, oxide films 42C having thickness of 0.6 μm are formed on the surfaces of the pair of protrusive supporting portions 42, respectively, by performing the oxidation treatment similar to the above-mentioned first embodiment, and the bottom faces 42A facing each other serve as main discharge surfaces.

The surge protector 40 has the same operation and effect as those of the surge protector 1 according to the above-mentioned embodiment.

Figure 7:
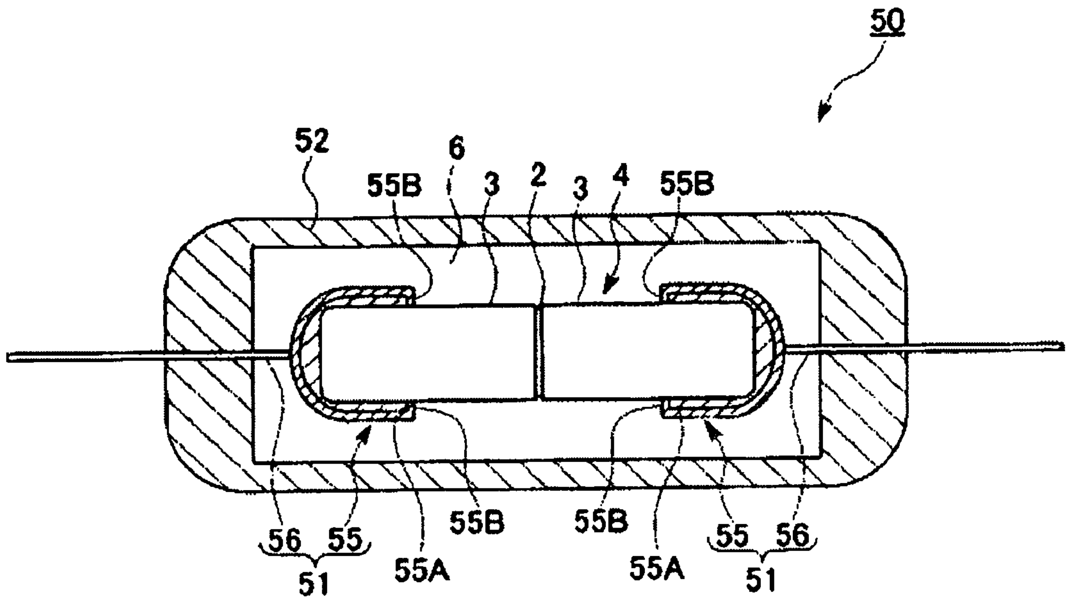
FIG. 7 is a cross-sectional view showing a surge protector according to a further embodiment of the invention in an axial direction.

Next, a further embodiment is described with reference to FIG. 7 having the same basic structure as that in the other embodiments, and has structure in which another component is included in the above-mentioned embodiments. Accordingly, in FIG. 7, the same components as those in FIG. 1 are indicated by the same reference numerals, and the description thereof will be omitted.

The surge protector is a surface mounting type surge protector. However, a surge protector 50 according to the fifth embodiment is a surge protector having lead wiring lines.

The surge protector 50 includes a column-shaped ceramic member 4 having a divided conductive film 3 thereon, main discharge electrode members 51 disposed on both ends of the column-shaped ceramic member 4, respectively, and a glass tube for sealing the column-shaped ceramic member 4 and the main discharge electrode members 51.

Each of the main discharge electrode members 51 includes a cap-shaped electrode 55 and a lead wiring line 56 extending from the rear end of the cap-shaped electrode 55.

In addition, oxide films 55A having thickness of 0.6 μm are formed on the surfaces of the pair of cap-shaped electrodes 55, respectively, by performing the oxidation treatment similar to the above-mentioned embodiment, and the surfaces facing each other serve as main discharge surfaces 55B.

The glass tube 52 is disposed so as to cover the column-shaped ceramic member 4 and the pair of cap-shaped electrodes 55, and the lead wiring lines 56 extend from the both ends of the glass tube.

The surge protector 50 has the same operation and effect as those of the surge protector 1 according to the above-mentioned embodiments.

Figure 8:
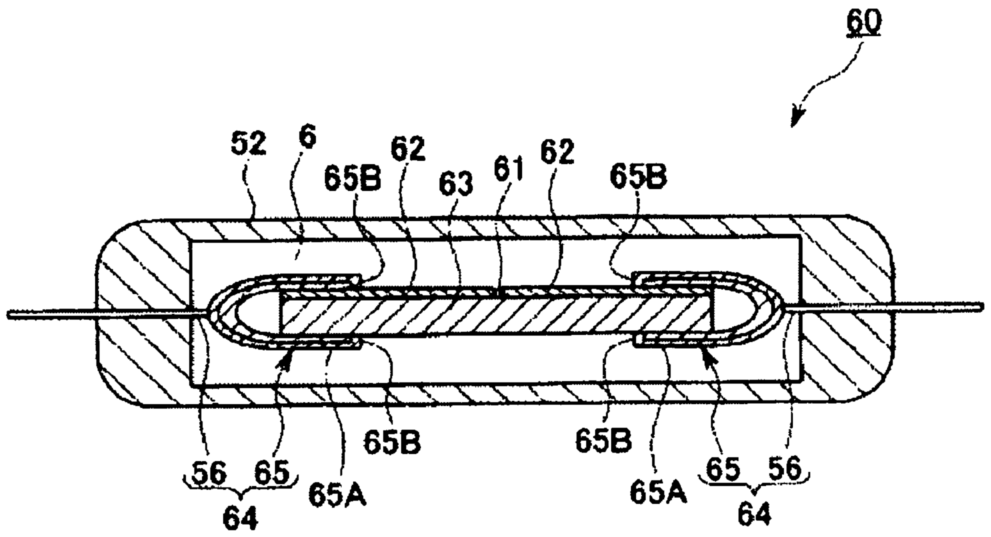
FIG. 8 is a cross-sectional view showing a surge protector according to another embodiment of the invention in an axial direction.

Next, a further embodiment will be described with reference to FIG. 8 having the same basic structure as that in the previous embodiment, and has structure in which another component is included in the above-mentioned embodiment. Accordingly, in FIG. 8, the same components as those in FIG. 7 are indicated by the same reference numerals, and the description thereof will be omitted.

In the previous embodiment, the cap-shaped electrodes 55 are disposed on both ends of the column-shaped ceramic member 4 having a divided conductive film 3 thereon. However, in a surge protector 60 according to this embodiment, main discharge electrode members 64 are disposed on both ends of a plate-shaped ceramic member 63, which has a conductive film 62 divided by a discharge gap 61 interposed on one surface thereof.

Each of the main discharge electrode members 64 includes a clip electrode 65, which comes in contact with the conductive film 62 and clamps the plate-shaped ceramic member 63, and a lead wiring line 56 extending from the rear end of the clip electrode 65.

Oxide films 65A having thickness of 0.6 μm are formed on the surfaces of the clip electrodes 65, respectively, by performing the oxidation treatment similar to the above-mentioned embodiment, and the surfaces facing each other serve as main discharge surfaces 65B. Furthermore, since each of the clip electrodes 65 clamps the plate-shaped ceramic member 63, it is possible to obtain excellent ohmic contact between the conductive film 62 and the clip electrode 65.

The surge protector 60 has the same operation and effect as those of the surge protector 1 according to the above-mentioned embodiment.

FIRST EXAMPLE

Next, the surge protector according to the invention will be described in detail by an example with reference to FIGS. 9 and 10.

When the surge protector 20 according to the above-mentioned embodiment and the conventional surge protector not having the oxide films 23B are mounted on the circuit boards, respectively, the service life of the surge protectors has been compared with each other.

Figure 9:
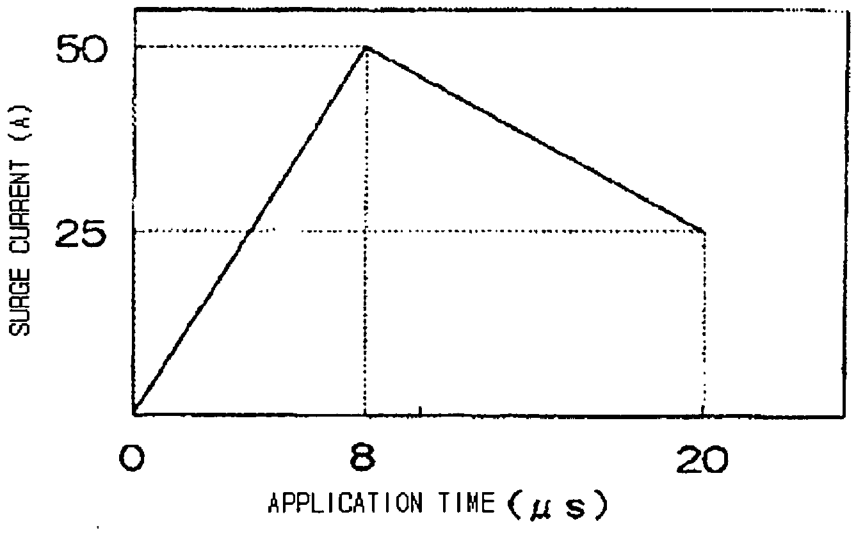
FIG. 9 is a graph showing the relationship between an applying time of surge current flow and surge current in an embodiment of the invention.
Figure 10:
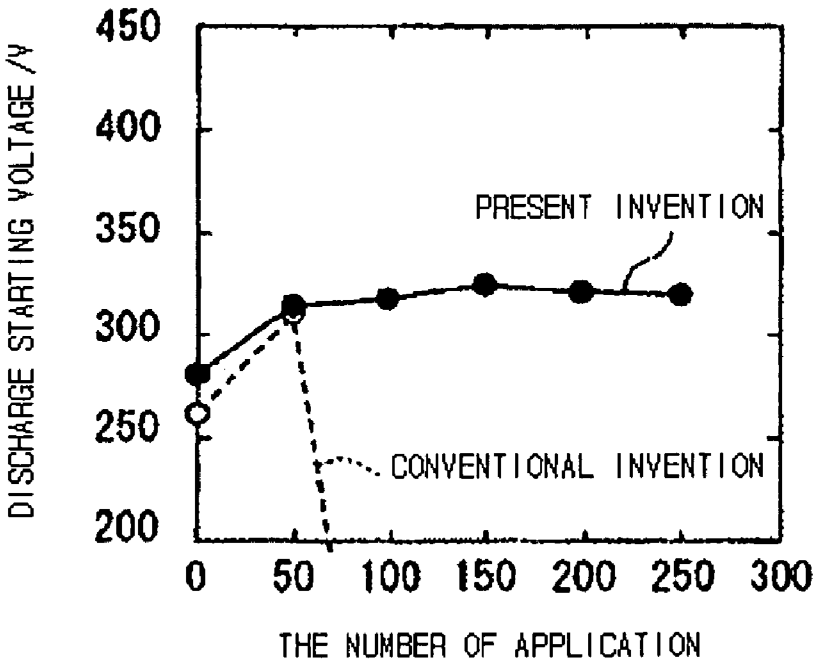
FIG. 10 is a graph showing the relationship between the number of application of the surge protector and a discharge starting voltage of the surge protector.

Specifically, surge current flow shown in FIG. 9 is repeatedly applied to the surge protector at predetermined times in the example, and then discharge starting voltage (V) is measured in the discharge gap. The measured results are shown in FIG. 10.

When the surge current flow is repeatedly applied to the conventional surge protector, large amount of the metal components of the metal electrodes of the main discharge electrode members are scattered and deposited in the discharge gap in a relatively short time. For this reason, the discharge starting voltage in the discharge gap decreases, and thus the service life of the conventional surge protector ends quickly. Meanwhile, in the surge protector 20 according to the invention, since the oxide films 23B restrain the electrode components of the main discharge electrode members 21 from scattering, the metal components are barely deposited in the discharge gap 2. It can be understood that the discharge starting voltage in the discharge gap is stabilized.

The invention is not limited to the above-mentioned embodiments, and can have various modifications within the scope of the invention.

Figure 11:
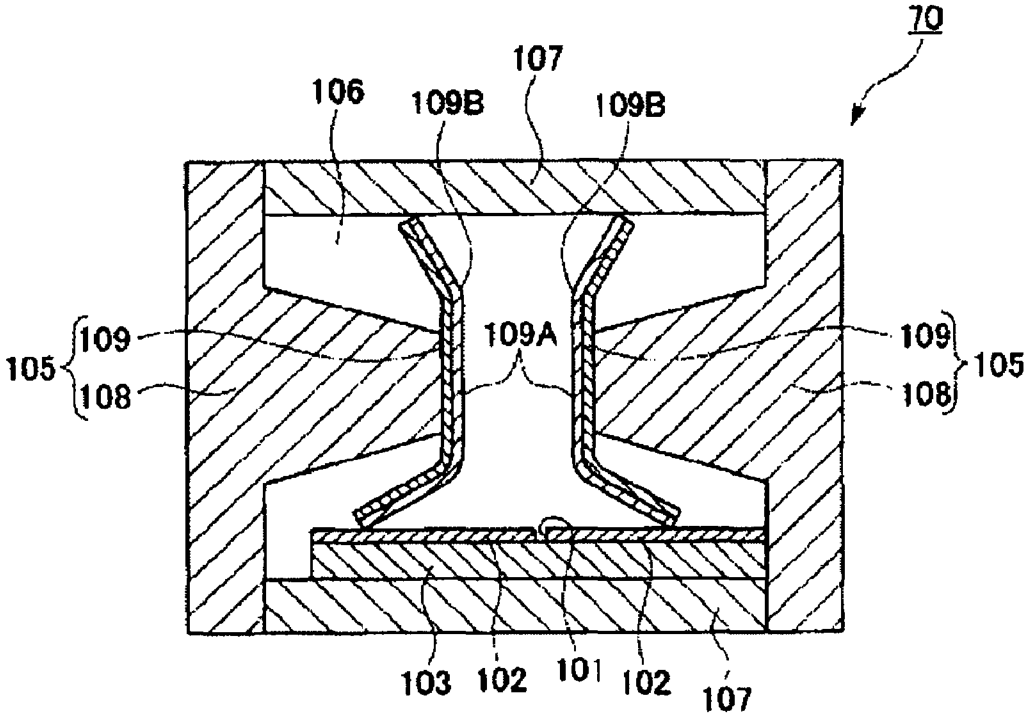
FIG. 11 is a cross-sectional view showing a surge protector to which the invention can be applied.
Figure 12:
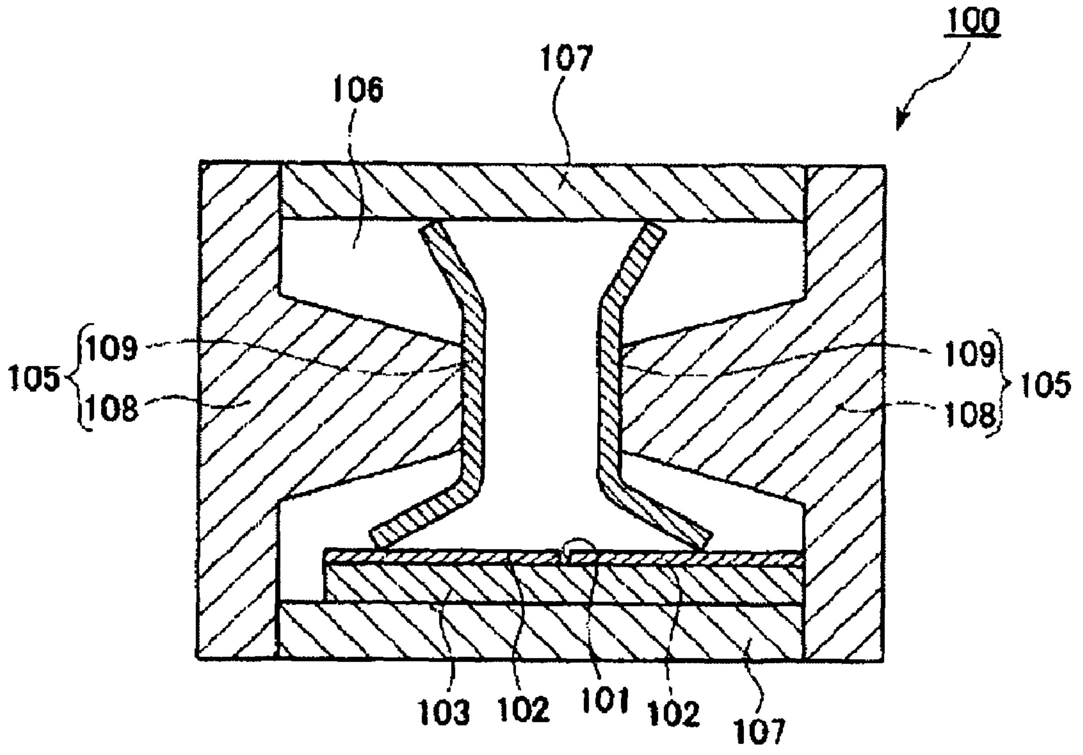
FIG. 12 is a cross-sectional view showing a conventional surge protector.

For example, as shown in FIG. 11, in a surge protector 70, oxide films 109B may be formed on main discharge surfaces 109A of a pair of conductive leaf springs 109, which face each other, by performing the oxidation treatment similar to the above-mentioned embodiments. In this case, the surge protector 70 has the same operation and effect as those of the surge protector according to the above-mentioned embodiment.

Furthermore, the conductive film may be made of Ag (silver), Ag (silver)/Pd (palladium) alloy, $SnO_2$ (tin dioxide), Al (aluminum), Ni (Nickel), Cu (copper), Ti (titanium), Ta (tantalum), W (tungsten), SiC (silicon carbide), BaAl (barium alumina), C (carbon), Ag (silver)/Pt (platinum) alloy, TiO (titanium oxide), TiC (titanium carbide), TICN (carbonitrided titanium), etc.

Moreover, the main discharge electrode members may be made of Cu or Ni based alloy.

In addition, each of the metallization layers, which are formed on both end faces of the cylindrical ceramic member 7, may be made of Ag (silver), Cu (copper), or Au (gold). Furthermore, the cylindrical ceramic member may be sealed by means of only active metal brazing not using the metallization layers.

Moreover, composition of the sealing gas may be regulated in order to obtain desired electrical characteristics. For example, the sealing gas may be, for example, the atmosphere (air), or may be Ar (argon), $N_2$ (nitrogen), Ne (neon), He (helium), Xe (xenon), $H_2$ (hydrogen), $SF_6$, $CF_4$, $C_2$, $F_6$, $C_3F_8$, $CO_2$ (carbon dioxide), and mixed gas thereof.

According to the invention, since the oxide films formed by the oxidation treatment have an excellent chemical stability at the high temperature range and an excellent adherence to main discharge electrodes, the characteristics of the oxide films can be sufficiently exhibited. Therefore, the service life of the surge protector can be lengthened.

What is claimed is:

1. A surge protector comprising:

an insulating member having a conductive film divided by a discharge gap interposed therebetween;

a pair of main discharge electrode members containing Cr(chromium), and one or more of Fe(iron), Ni(nickel), Co(cobalt) and Cu(copper), opposite to each other contacting the conductive film;

an insulating tube fitted to the pair of main discharge electrode members opposite to each other to seal both the insulating member and a sealing gas inside thereof; and oxide films having an average thickness in the range of 0.01 to 2.0 μm formed on main discharge surfaces of the pair of main discharge electrode members by performing an oxidation treatment, the oxide films having a Cr (chromium) concentration that is higher at an exterior surface than at an interior surface adjacent to the respective electrode member wherein the chromium concentration of oxide film is at least 10% at the external surface.

2. A surge protector comprising:

a column-shaped insulating member having a conductive film divided by a discharge gap interposed in an intermediate of a peripheral surface;

a pair of main discharge electrode members containing Cr(chromium), and one or more of Fe(iron), Ni(nickel), Co(cobalt) and Cu(copper), opposite to each other on both ends of the insulating member contacting the conductive film;

an insulating tube fitted to the pair of main discharge electrode members opposite to each other to seal both the insulating member and a sealing gas inside thereof, wherein the main discharge electrode members comprise:

peripheral portions attached to end faces of the insulating tube by brazing filler metal;

protrusive supporting portions protruding toward an inside and an axial direction of the insulating tube and supporting the insulating member in the radial inner surface thereof, and oxide films having an average thickness in the range of 0.01 to 2.0 μm formed on main discharge surfaces of the protrusive supporting portions of the pair of main discharge electrode members opposite to each other, by performing an oxidation treatment, the oxide films having a Cr (chromium) concentration that is higher at an exterior surface than at an interior surface adjacent to the respective electrode member wherein the chromium concentration of oxide film is at least 10% at the external surface.

* * * * *